United States Patent [19]
Brown, Jr.

[11] Patent Number: 5,165,174
[45] Date of Patent: Nov. 24, 1992

[54] HARVESTING APPARATUS AND METHOD FOR RETRIEVING SUBSEA TRAPS

[76] Inventor: Arvid K. Brown, Jr., P.O. Box 451, Chokoloskee Island, Fla. 33925

[21] Appl. No.: 697,943

[22] Filed: May 9, 1991

[51] Int. Cl.⁵ .............................................. A01K 81/04
[52] U.S. Cl. ........................................ 43/6.5; 43/27.4; 43/27.2; 254/371
[58] Field of Search ............... 43/6.5, 27.2, 27.4; 254/371, 374

[56] References Cited

U.S. PATENT DOCUMENTS

| | | | |
|---|---|---|---|
| 2,741,052 | 4/1956 | Shibuya | 43/6.5 |
| 3,831,311 | 8/1974 | Cushing | 43/6.5 |
| 4,354,667 | 10/1982 | Svendsen | 254/371 X |
| 4,644,682 | 2/1987 | Cloud | 43/6.5 X |
| 4,736,541 | 4/1988 | Serba | 43/27.2 X |

FOREIGN PATENT DOCUMENTS 2358354 3/1978 France ............................. 254/371

Primary Examiner—Richard K. Seidel
Assistant Examiner—Patty E. Hong
Attorney, Agent, or Firm—Arthur G. Yeager

[57] ABSTRACT

The apparatus is mounted on a deck of a boat and includes an elongated track with an inboard end and outbroad end disposed to at least the waterline for capturing a line having a float on one end and a subsea trap on the other end. A trolley is movably mounted on the track and a funnel-like guide structure is connected to the outboard end to direct the float and line, as the boat moves forwardly, to a capturing hook mounted to the trolley. Upon movement of the trolley inboard the float and line are drawn to permit a hydroslave pulley to pull the trap to the boat above the waterline thereby harvesting the catch therefrom and rebaiting same prior to returning the trap to the sea. A novel method of retrieving the subsea traps is also set forth herein.

20 Claims, 5 Drawing Sheets

FIG I

HARVESTING APPARATUS AND METHOD FOR RETRIEVING SUBSEA TRAPS

BACKGROUND OF THE INVENTION

Subsea traps, including crab, lobster and other baited underwater fish traps, are used widely to catch such marine animals for food and other purposes. A great number of separate, individual spaced traps are usually set out by one or two fishermen on a boat and these must be serviced and inspected from time to time in order to obtain the catch and rebait the traps. Each trap rests on the bottom of the body of water and is attached to a line that must be accessible to the fisherman in a boat on the surface of the water. Buoys are attached to the line to make the line readily accessible to the fisherman. The servicing of a string of traps is a time-consuming and back breaking job, usually accomplished by one or two fishermen in a small boat. There has been for many years a need for an inexpensive mechanical and power means to assist a fisherman in servicing a series or string of such subsea traps.

It is an object of this invention to provide a novel mechanical harvesting apparatus for snagging lines to subsea traps, bringing the traps to the surface for servicing, and releasing rebaited traps to settle to the bottom again. It is another object of this invention to provide such an apparatus which is mountable on a boat that can service many lines of spaced subsea traps.

The subsea trap harvesting apparatus according to this invention allows a boat captain to maintain a constant speed as he pilots his boat along a series of spaced traps and as the boat approaches a trap, the apparatus will snag the line and buoy. Once the line is hooked, a crewman will activate the apparatus to pull the line connected to the trap up and around a hydroslave. The hydroslave will then pull the trap and its contents to the surface. The crewman can then empty and re-bait the trap. Upon emptying the trap the crewman resets the apparatus to capture the next line and buoy of the next trap as the boat approaches it. The harvesting apparatus thus will relieve the crew of some of the strenuous work involved with commercial subsea trap operations, greatly reduce worker fatigue and enhance a boat's productivity. Still other objects will become apparent from the more detailed description which follows.

BRIEF DESCRIPTION OF THE INVENTION

This invention relates to an apparatus for retrieving spaced subsea traps each attached by a line to a floating buoy which comprises a supporting frame for attachment to a boat deck, an arm laterally extending from the frame to the water level abeam of the boat, a hook means movable along the arm, and adapted to snag the line, and a power means adapted to haul in the line and the trap connected thereto.

In specific and preferred embodiments of the invention the hook means includes a hook mounted on a trolley that runs along the arm selectively in either direction from one end to the other of the arm and capable of snagging a line between a buoy and a fish trap and bringing that line to a fisherman on the boat. The fisherman can then apply the line to the power means which will bring the trap to a place for the fisherman to remove the catch, rebait the trap, and return it to the water attached to its same line and buoy. Another preferred embodiment includes a pair of spaced guide members attached to the end of the arm and positioned to travel through the water, near its surface, to guide a buoy and its line to the trap into a position to be snagged by the hook attached to the trolley.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
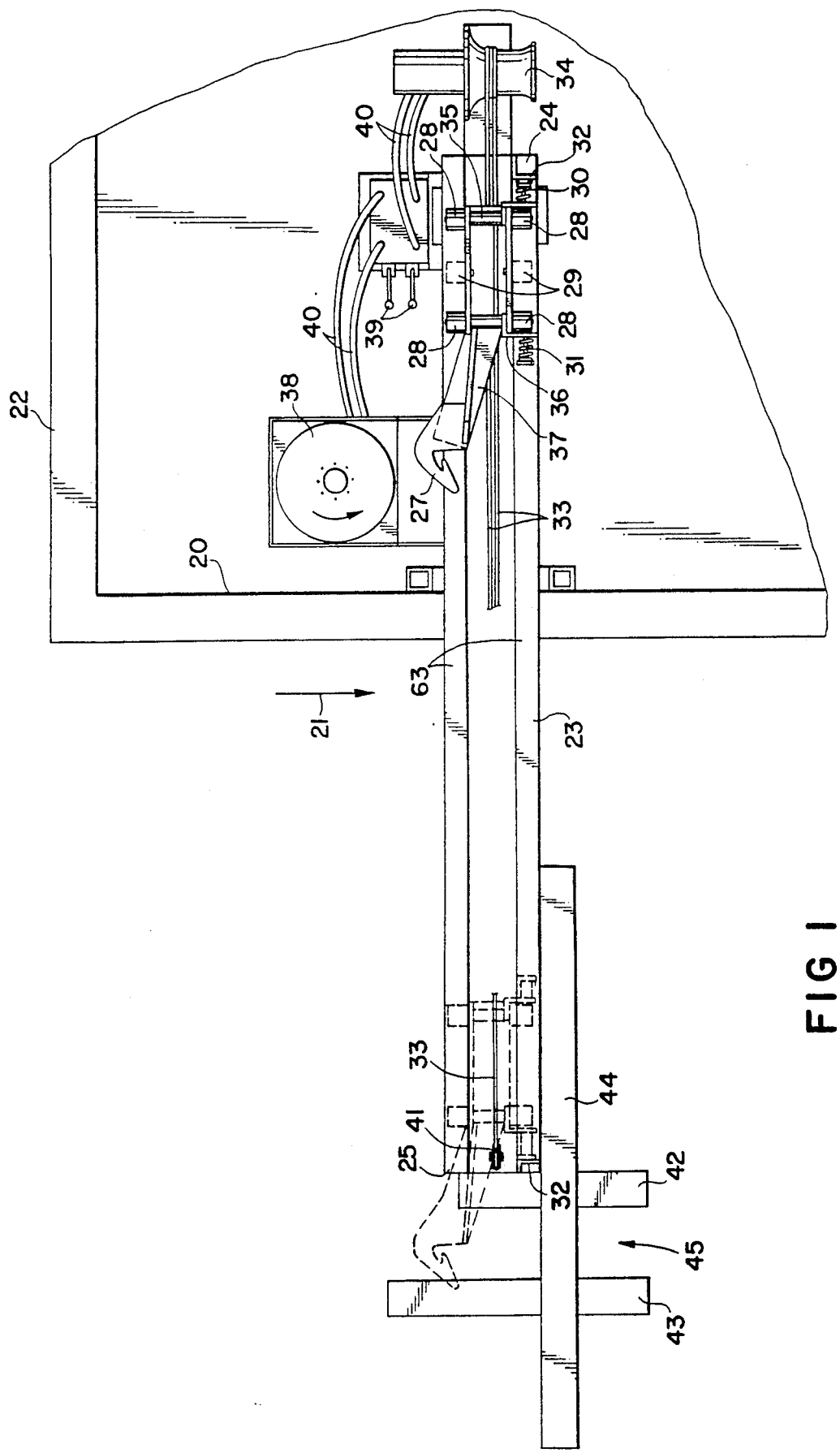
FIG. 1 is a top plan view of the harvesting apparatus of this invention without the guide.
Figure 2:
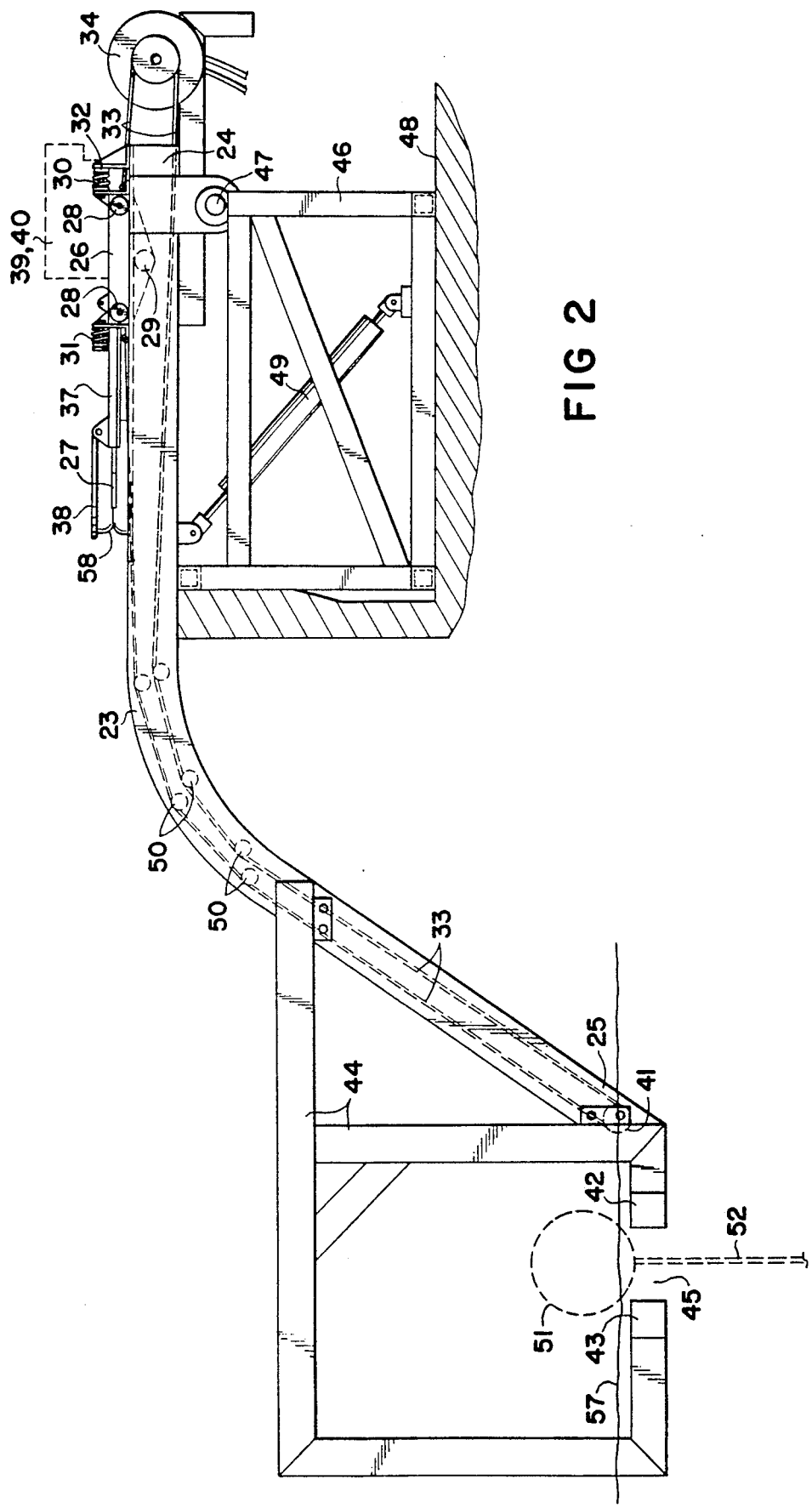
FIG. 2 is a front elevational view of the harvesting apparatus of FIG. 1.

The invention is best understood by reference to the attached drawings showing the details of structure and operation. With particular reference to FIGS. 1–2 the structure of the harvesting apparatus of this invention may be understood.

The harvesting apparatus is preferably mounted on the aft deck of a boat on either the port or starboard sides near the stern. In FIGS. 1–2 the apparatus is shown near the starboard side 20 and the stern 22 with the movement of the boat through the water in the direction indicated by arrow 21. Of course, if it is to be mounted on the port side, the configuration of the apparatus must be accordingly changed. The apparatus rests on a supporting framework 46 which raises the entire apparatus to a sufficient elevation that an arm 23 may reach over side 20 and down to at least the water level.

The main operational component of the apparatus is arm 23 having a proximate end portion 24 resting on framework 46 and a distal end portion 25 extending laterally abeam of the boat sufficient to be easily seen by the pilot and yet close enough to make it not too cumbersome to handle. Generally, the distal end portion 25 of arm 23 may be from 2–6 feet from the side of the boat. At distal end portion 25 there are a pair of spaced guides 42 and 43 generally perpendicular to arm 23 forming a channel passageway 45 therebetween. One of the functions of arm 23 is to provide a means to snag the line connecting a floating buoy to a fish trap lying on the bottom of the body of water. For purposes of simplifying this description the terms "subsea trap" and "bottom of water" will be used even though it is understood to include crab, lobster and fish traps and other traps for catching marine life on the bottom of a body of water that may be an ocean, a gulf, a bay, a lake, a river, or the like of salt water, fresh water, or brackish water.

Figure 3:
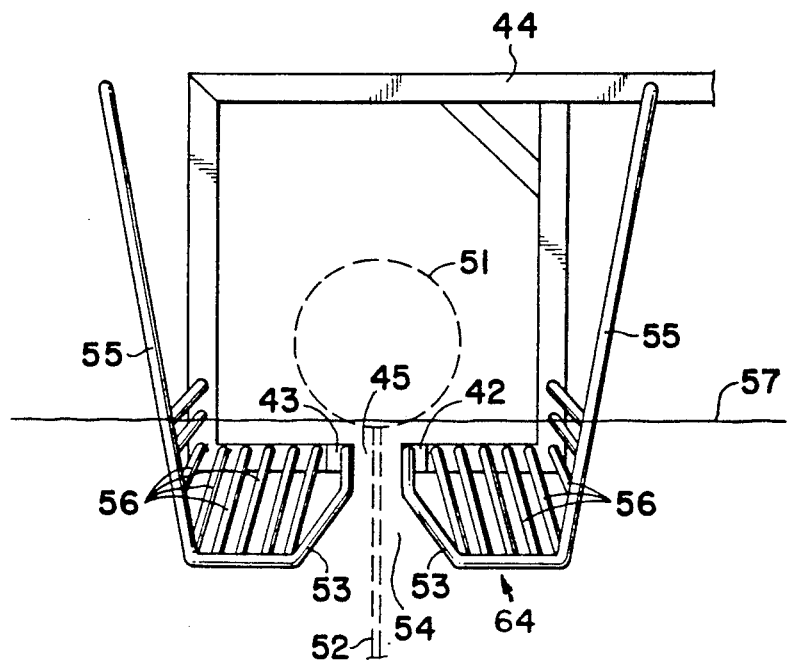
FIG. 3 is a front elevational view of the guide structure mounted on the outer end portion of the apparatus shown in FIG. 1.
Figure 4:
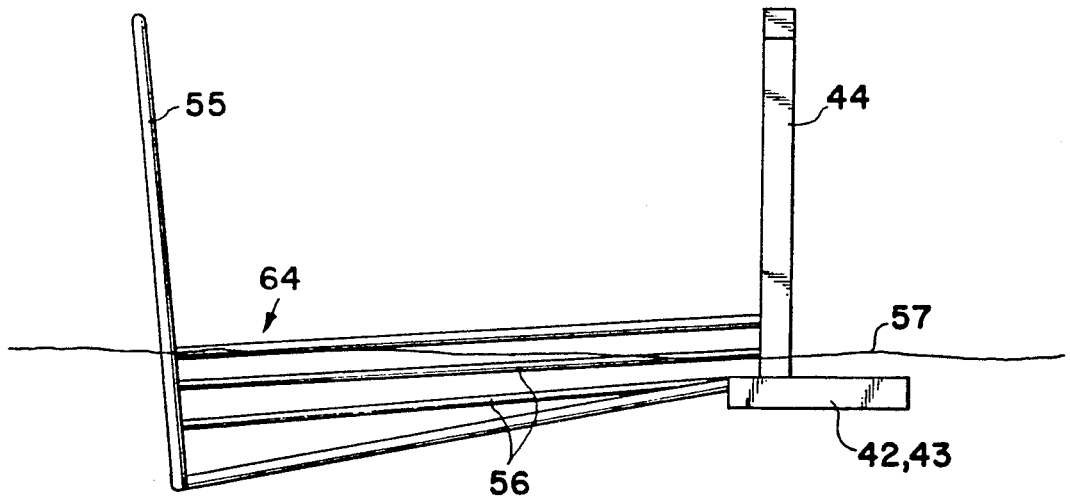
FIG. 4 is a side elevational view of the guide member of FIG. 3.

The purpose of guide members 42 and 43 is to provide a means to straddle a buoy line and make it pass through channel 45 so that it can be snagged and the subsea trap pulled upward into the boat. Channel space 45 is relatively narrow, perhaps not more than about 6 inches, and since this is a very narrow passageway for the boat pilot to aim at in trying to snag a subsea trap line, there is a much larger funnel-like or basket structure 64 attached to guide members to assure capture of a buoy and guide a buoy line into channel 45. This structure 64 will be discussed more fully below in connection with FIGS. 3 and 4.

Arm 23 also serves as a track for a movable trolley 26 carrying hook 27 between its extremes of travel at distal end portion 25 and at proximate end portion 24. At the extreme near distal end portion 25, hook 27 will be placed in the middle of channel space 45, effectively closing the space 45, to snag the buoy line 52 connecting floating buoy 51 to the submerged subsea trap on the bottom of the water. Trolley 26 is shown to have two pairs of upper wheels 28 and one pair of lower wheels 29 that engage inward facing rails or flanges 63 of arm 23 as a track for wheels 28 and 29. Arm 23 preferably is a combination of two curved channel beams with their flanges facing each other and spaced apart sufficiently to allow trolley 26 to move as the wheels 28 and 29 roll on those flanges 63. Upper wheels 28 roll on the top sides of the upper flanges 63 while wheels 29 roll on the bottom sides of those same flanges 63. Thus trolley 26 cannot be removed from arm 23 except at open ends 24 or 25 or by other disassembly.

Trolley 26 is moved between its extremes of travel at proximate end portion 24 and distal end portion 25 by a cable 33 which passes over a series of guide rolls 50, around distal pulley 41, and around the drum of a power winch 34. One end of an elongated cable 33 is attached to forward end 36 of trolley 26 and the other end of cable 33 to the rearward end 35 of trolley 26. Winch 34 can be turned in either direction, and accordingly, trolley 26 moves toward or away from distal end portion 25 of arm 23. Trolley 26 has a forwardly extending neck 37 with a sturdy hook 27 at the forward end. Hook 27 is fashioned to retain its hold on buoy line 52 regardless of the pitching and yawing motions of the boat. Neck 37 is long enough to position hook 27 in the middle of channel 45 when trolley 26 stops at the distal end 25 of arm 23, as shown by broken lines in FIG. 1. Trolley 26 includes a forward spring means 31 and a rearward spring means 30 extending forwardly and rearwardly, respectively, of trolley 26 to function as bumpers for stopping trolley 26 in its forward or rearward movement. Stop 32 is shown in FIG. 1 engaging rear spring means 32, preventing trolley 26 from moving any closer to winch drum 34. There is a similar forward stop 32' to position the trolley 26 and to accurately locate hook 27 in channel 45. Guide rollers 50 are located in appropriate positions to allow cable 33 to follow the sweeping downward curve of arm 23 and to prevent cable 33 from interfacing with the movement of trolley 26 along arm 23.

Arm 23 is pivotal about pin 47 which is mounted on framework 46 so as to permit arm 23 and the guide structure 64 to be lifted upwardly out of the water for maintenance, service, and inspection and while the boat is not performing its harvesting functions. The power to pivot arm 23 upward or downward is provided by hydraulic cylinder 49.

A structural supporting combination of beams 44 provides the strength for supporting guide structure 64 at the distal end 25 of arm 23. Guide structure 64 is merely a pair of leading members 55 and a plurality of connecting members 53 and 56 to join leading members 55 rigidly to beam structure 44. Leading members 55 extend upward above water level 57 so as to be readily visible to the boat pilot. Guide rails 53 join guide members 42 and 43 to forward members 55 so as to make a converging funnel guide channel from wide opening 54 between members 55 to narrow channel 45 between guide members 42 and 43. This arrangement makes it relatively easy for the boat pilot to guide the boat so as to allow opening 54 to straddle the next buoy 51, and to assure the passage of buoy line 52 into channel 45 as the boat moves forward. Stringers 56 are employed in sufficient number to make the entire structure rigid and prevent the captured buoy from escaping after passing through the open front of the guide structure 64.

There also is employed as a part of the apparatus of this invention buoy line power means in the form of a hydroslave 38, preferably designed with two convex faces that meet in a nip 58 which is capable of grasping buoy line 52 and pulling it onto the boat so as to bring the fish trap to the boat for removal of the catch, replacement of bait, and return to the water. The hydroslave 38 is positioned near to arm 23 so as to make it convenient to transfer buoy line 52 from hook 27 to nip 58 of hydroslave 38.

Power to operate winch 34, power means 38, and cylinder 49 is preferably hydraulic power. A suitable compressor or pump may be the basic power supply for pressurized fluid through lines 40 to cylinder 49, winch 34, and power means 38. Suitable controls 39 are available for the operator to select, turn on, and turn off whatever component is needed at the time.

Figure 5:
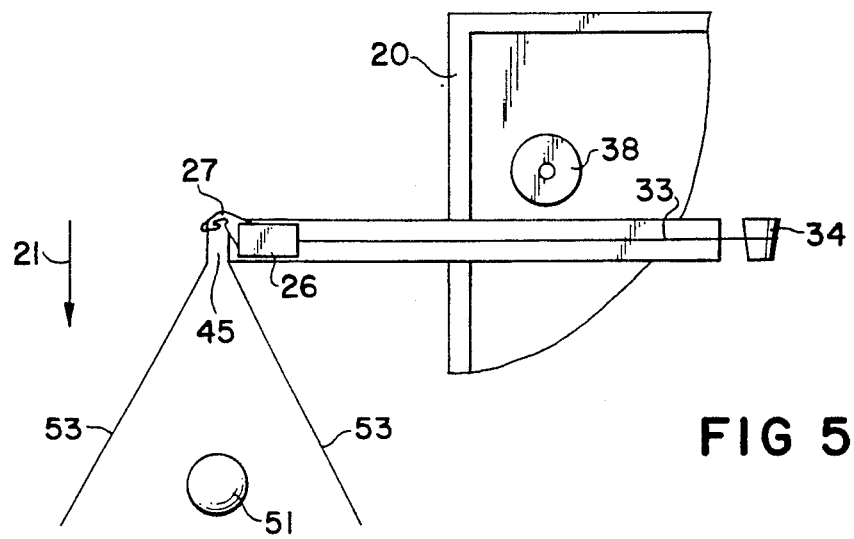
FIG. 5 is a schematic top plan view of the apparatus on a boat approaching a buoy.
Figure 6:
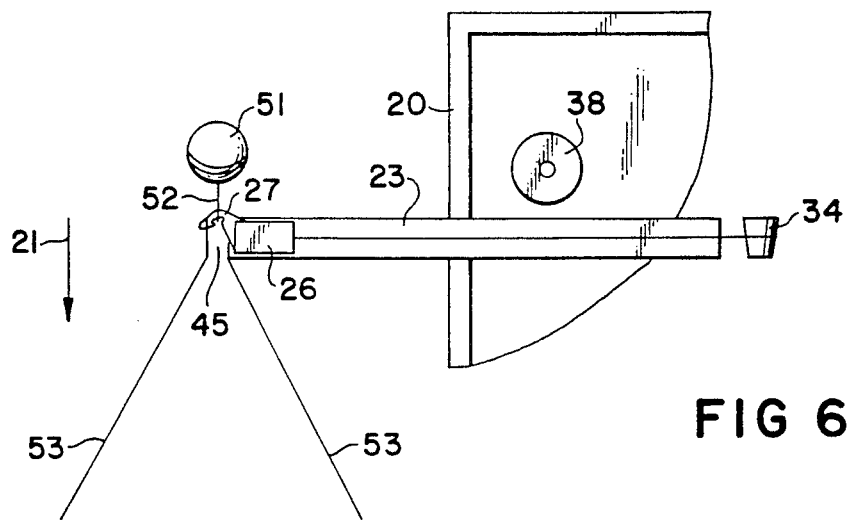
FIG. 6 is a schematic top plan view of the apparatus on a boat snagging the buoy line.
Figure 7:
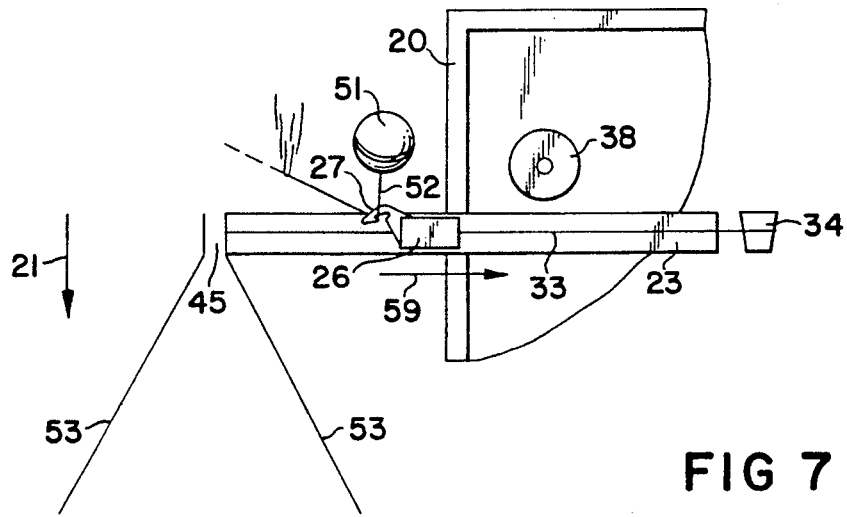
FIG. 7 is a schematic top plan view of the apparatus on a boat bringing the buoy and its line onto the boat.
Figure 8:
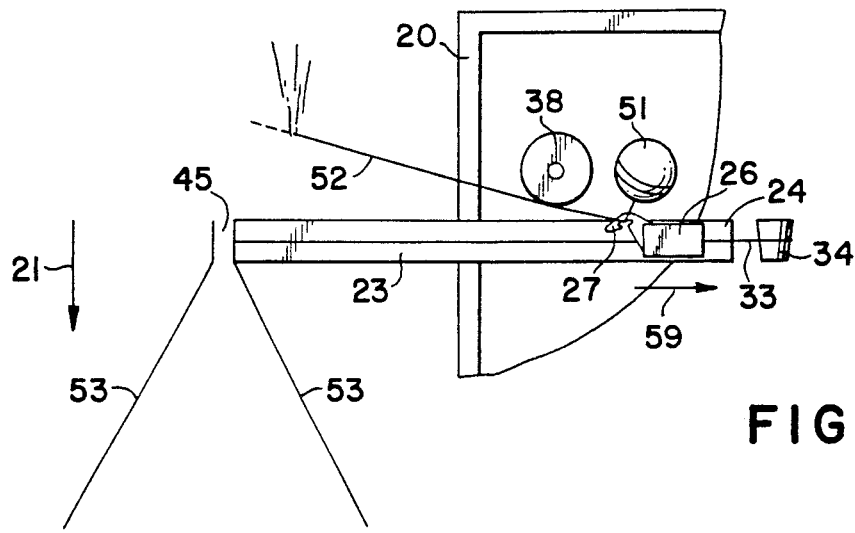
FIG. 8 is a schematic top plan view of the apparatus on a boat with the buoy retrieved onto the boat.
Figure 9:
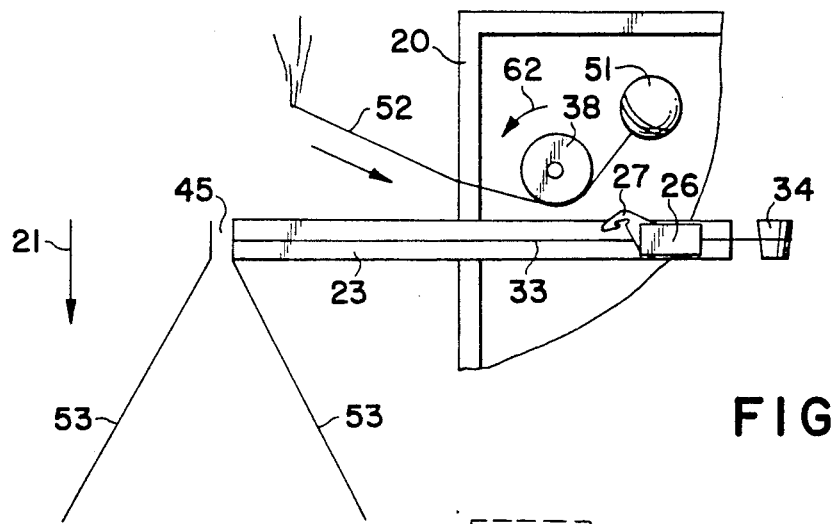
FIG. 9 is a schematic top plan view of the apparatus on a boat and the buoy line being gripped and pulled inboard by a power means.
Figure 10:
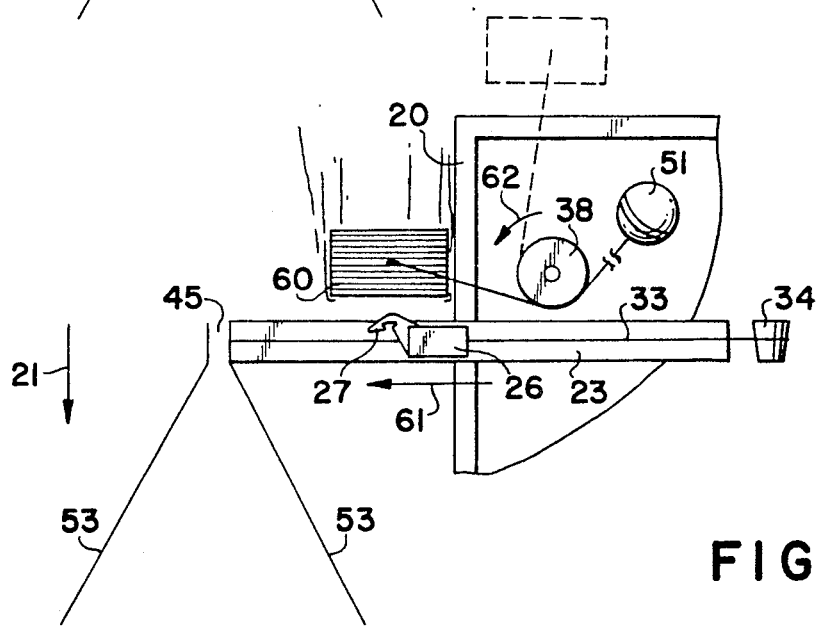
FIG. 10 is a schematic top plan view of the apparatus on a boat with the fish trap retrieved for servicing thereof by a fisherman on the boat either alongside or aft of the boat.

In FIGS. 5-10 there are shown the sequential method and operations of the harvesting apparatus in retrieving fish traps. In FIG. 5 boat 20 is moving in the direction of arrow 21 to place buoy 51 in the funnel opening between guide rails 53. In FIG. 6 the boat 20 has moved sufficiently ahead for hook 27 of trolley 26 to snag buoy line 52 as it passes through channel 45. In FIG. 7 winch 34 has been turned on to move trolley 26 in the direction of arrow 59 while buoy line 52 remains snagged by hook 27, and carrying buoy 52 along to the boat deck. It is to be understood that a knot in the line beneath the buoy 52 will be positioned on the hook 27, i.e., buoy 51 would normally be shown basically covering hook 27 in FIG. 7 and in FIG. 8. In FIG. 8 trolley 26 has reached proximate end portion, 24 of arm 23 and stopped while buoy line 52 remains snagged by hook 27. Meanwhile boat 20 has moved ahead with buoy line 52 trailing along behind. In FIG. 9 buoy line 52 is engaged with hydroslave 38 which turns in the direction of arrow 62 to reel in buoy line 52. In FIG. 10 subsea trap 60 has been brought to the surface of the water, either alongside or aft, by reeling in buoy line 52 by hydroslave 38. The trap is now in position to be unloaded of its catch, rebaited, and thrown back into the water. At the same time trolley 26 is now free to be moved again to distal end 25 of arm 23 so as to be ready to snag the next buoy and its buoy line. The movement of winch 34 is reversed to make cable 30 move in the direction of arrow 61 to return trolley 26 to the distal end portion 25 with hook 27 in position blocking passageway 45 to snag the next buoy.

In summary, the guide structure 64 directs the buoy and its line into the trolley hook 27 that has been prepositioned near the water line. Once the buoy line has been captured in the trolley hook 27 the trolley 26 is pulled along the rails 64 up to the work area within the boat. A cable 33 pulls the trolley 26 along the rails 64 by means of a hydraulically driven winch 34. The winch 34 also returns the trolley 26 back to the buoy guide mounting members 42-44 once the buoy line has been brought to the work area. A hydraulically driven pulley or hydroslave 38 is attached to the trolley rail in such a position so that the buoy line may be automatically transferred from the trolley hook to the hydroslave. The hydroslave then pulls the buoy line and subsea trap into the boat where the trap is emptied. The buoy, buoy line and trap are then thrown back into the sea for future catches. The captain continually moves the boat toward the next buoy while this operation is taking place.

The trolley rails 63 are held in place during the above operations by the support structure 46. The support structure 46 is bolted to the deck of the boat. The trolley rails 63 are hinged by pin 47 to the support structure 46 allowing the trolley rails and all attachments to be raised to a vertical position when the boat is traveling to and from location. Once the boat reaches the offshore location of the subsea traps, the trolley rails and all attachments are lowered into the sea for the trap harvesting operation. Lifting and lowering of the trolley rail is achieved by hydraulically driven cylinder 49. A power winch 34 moves the trolley, power pulley or hydroslave pulls in the buoy line 52 and trap, and hydraulic cylinder 49 raises and lowers the trolley rails 63. All power units receive their hydraulic power preferably from a hydraulic motor driven directly from the main engine of the boat. Each of the power units has its own separate control 39.

It will be appreciated that the harvesting apparatus of this invention reduces the labor force of persons required to retrieve the traps and service them for further use and/or to make the same labor force much more productive and less tired than in normal hand hooking operations.

At present commercial crabbing operation involves driving a boat down a line of buoys while a crew member on the back of the boat uses a gaff to retrieve the crab trap line. If there is no slack present in the rope, the force required to lift the line may exceed two hundred pounds Accordingly, a boat captain may be required to stop and reverse the boat to allow for the needed slack in the line. In addition, the boat must be reversed if the crew member misses the buoy on the first pass. Once the line has been brought to the boat, it is fed into a hydroslave and the trap is pulled to the surface. The crew member must then empty, re-bait, and make any necessary repairs to the trap.

Thus this invention improves the working conditions for a crewman fisherman by reducing fatigue, injury and absenteeism; permits operation of the boat at a constant speed, without slowdowns or turnarounds for missed traps, thereby conserving fuel, permits harvesting with or against the tide (current hand retrieval cannot be performed with the tide due to slack being required in the line wrapped around a hydroslave); and the length of the buoy line may be reduced since slack therein is not critical to harvesting traps in accord with this invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A harvesting apparatus for retrieving subsea traps each attached by a line to a floating buoy, which comprises a supporting frame for attachment to a boat deck, an elongated arm having an end portion in a boat and laterally extending from said frame to its other end portion adjacent the water level abeam of a boat, a hook means movably located and supported by said arm for snagging said line beneath a buoy, means supported by said arm for moving said hook means between said end portions, and means adapted to be selectively engaged by a line to raise a trap to an upper edge of a wall of a boat.

2. The apparatus of claim 1 further comprising pivot means attaching said end portion of said arm to said frame, a pair of spaced guides generally parallel to a keel of a boat attached to said other end portion of said arm and extending generally forwardly to an open entrance.

3. The apparatus of claim 2 wherein said hook means includes a hook mounted on a trolley which is movable along said arm in both directions between said end portions.

4. The apparatus of claim 3 wherein said trolley includes an elongated base and three spaced sets of wheels, said arm having a pair of spaced flanges onto which respective said wheel of each said set is engaged, one said set of wheels between two of said sets of wheels engaging surfaces of said flanges and said two sets of wheels engaging opposite surfaces of said flanges.

5. The apparatus of claim 1 wherein said means for moving said hook means along said arm is defined by a first power means, a second power means to raise and lower said arm, and a third power means to operate said means to raise a trap.

6. The apparatus of claim 5 wherein said power means are hydraulic power devices.

7. The apparatus of claim 2 wherein said guides at said other end portion include forward ends which are spaced widely apart and rearward ends which are spaced closely together whereby a buoy and its line is funnelled into a space occupied by said hook means.

8. A harvesting apparatus for mounting on the deck of a boat and to retrieve subsea traps attached by separate lines to respective floating buoys, which comprises:
(a) a supporting structural framework mounted on a deck of the boat;
(b) an arm pivotally attached to said framework so as to move in an arc upwardly closer inboard and downwardly closer outboard, said arm when positioned downwardly extending laterally abeam of a side of the boat from a proximate end at said framework to a distal end at approximately water level laterally outward from the boat;

(c) an elongated trolley having opposite end portions and being mounted on said arm so as to move in either direction between said proximate end and said distal end, said trolley having a hook extending outwardly from one of its said end portions laterally from said distal end when said trolley is moved to its maximum outward position at said distal end;

(d) means located adjacent said proximate end for receiving and drawing a line between a buoy and its corresponding subsea trap; and (e) selective operated power means for moving said arm pivotally, for moving said trolley along said arm, and for powering said means for receiving and drawing a line.

9. The apparatus of claim 8 wherein said power means are powered by hydraulic fluid.

10. The apparatus of claim 8 wherein said arm includes an elongated track, and said trolley includes spaced rollers engaging said track for movement therealong.

11. The apparatus of claim 8 wherein said arm includes a pair of guide members spaced laterally apart from each other and attached to said distal end of said arm, and adapted to straddle a buoy and to guide its line into engagement with said hook.

12. The apparatus of claim 8 wherein said trolley includes an elongated base and three spaced sets of wheels, said arm having a pair of spaced flanges onto which respective said wheel of each said set is engaged, one said set of wheels between two of said sets of wheels engaging surfaces of said flanges and said two sets of wheels engaging opposite surfaces of said flanges.

13. The apparatus of claim 12 wherein said surfaces are under surfaces of said flanges and said opposite surfaces are upper surfaces of said flanges.

14. The apparatus of claim 8 wherein said means for receiving and drawing a line is defined by a hydroslave, said hook being positioned with respect to said hydroslave such that a line engaged with said hook will be automatically engaged with said hydroslave as the boat moves forward and said trolley moves to said proximate end.

15. The apparatus of claim 14 wherein said hydroslave is located aft of said arm and spaced from said proximate end inboard and adjacent the side of the boat over which said arm extends.

16. A harvesting method for retrieving subsea traps each attached by a line to a floating buoy and being spaced from the next along a series of generally aligned traps comprising the following steps:

(a) positioning a power operated movable hook in an outboard location below the waterline and abeam of a boat;

(b) moving the boat forwardly toward a first trap in the series;

(c) funneling a buoy and line of the first trap to cause the line to be engaged with and captured by the hook;

(d) moving the hook and its captured line and buoy inboard of the boat;

(e) engaging the captured line with a power operated means for pulling the captured line and its trap to the boat and out of the water; and (f) retrieving any catch in the trap, rebaiting same and returning the rebaited trap and its line and buoy to the water.

17. The method of claim 16 wherein step (e) is automatically performed by the appropriate locating of the power operated means with respect to the hook and its captured line so that the continued movement of the boat forward causes the captured line to engage the power operated means.

18. The method of claim 16 wherein step (d) is performed by a power operated winch with an elongated cable having respective ends associated with the hook for moving the hook inboard and outboard.

19. The method of claim 16 wherein step (a) is performed by locating an elongated track on the boat inboard of the boat and extending abeam of the boat and a trolley movable thereon and carrying the movable hook.

20. The method of claim 19 wherein step (d) is performed by a power operated winch with an elongated cable having respective ends connected to the trolley for moving the trolley and its hook inboard and outboard.

* * * * *